US 9,195,738 B2

(12) United States Patent
Parikh

(10) Patent No.: US 9,195,738 B2
(45) Date of Patent: *Nov. 24, 2015

(54) TOKENIZATION PLATFORM

(75) Inventor: Jignashu Parikh, Bangalore (IN)

(73) Assignee: YAHOO! INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,825

(22) Filed: Aug. 13, 2012

(65) Prior Publication Data

US 2012/0310630 A1  Dec. 6, 2012

Related U.S. Application Data

(63) Continuation of application No. 12/178,775, filed on Jul. 24, 2008, now Pat. No. 8,301,437.

(51) Int. Cl.
*G06F 17/27* (2006.01)
*G06F 17/30* (2006.01)

(52) U.S. Cl.
CPC ........ *G06F 17/30684* (2013.01); *G06F 17/277* (2013.01); *G06F 17/2735* (2013.01)

(58) Field of Classification Search
USPC .......................................................... 704/9
See application file for complete search history.

(56) References Cited

U.S. PATENT DOCUMENTS

| 5,806,021 | A | * | 9/1998 | Chen et al. ........................ 704/9 |
| 5,867,799 | A | * | 2/1999 | Lang et al. |
| 5,890,103 | A | * | 3/1999 | Carus ................................ 704/9 |
| 6,374,210 | B1 | | 4/2002 | Chu |
| 6,662,180 | B1 | | 12/2003 | Aref et al. |
| 6,904,402 | B1 | * | 6/2005 | Wang et al. ..................... 704/10 |
| 7,054,953 | B1 | | 5/2006 | Nakajima |
| 7,092,871 | B2 | * | 8/2006 | Pentheroudakis et al. ........ 704/9 |
| 7,146,381 | B1 | | 12/2006 | Allen et al. |
| 7,254,530 | B2 | | 8/2007 | Klavans et al. |
| 7,269,547 | B2 | | 9/2007 | Pentheroudakis et al. |
| 7,275,069 | B2 | | 9/2007 | Hundley et al. |
| 7,403,938 | B2 | | 7/2008 | Harrison et al. |
| 7,665,016 | B2 | | 2/2010 | Behrens et al. |
| 7,680,648 | B2 | | 3/2010 | Elbaz et al. |
| 7,685,083 | B2 | | 3/2010 | Fairweather |
| 7,734,091 | B2 | | 6/2010 | Van Lunteren |
| 7,765,097 | B1 | | 7/2010 | Yu |
| 7,818,165 | B2 | | 10/2010 | Carlgren et al. |
| 7,937,263 | B2 | | 5/2011 | Carrier et al. |
| 7,941,310 | B2 | * | 5/2011 | Park ................................... 704/7 |
| 8,015,175 | B2 | | 9/2011 | Fairweather |
| 8,078,607 | B2 | * | 12/2011 | Oztekin et al. ................ 707/708 |
| 8,229,732 | B2 | * | 7/2012 | Davtchev et al. ................ 704/8 |

(Continued)

*Primary Examiner* — David Hudspeth
*Assistant Examiner* — Timothy Nguyen
(74) *Attorney, Agent, or Firm* — Pillsbury Winthrop Shaw Pittman LLP

(57) ABSTRACT

A tokenization platform and method is described for accurately tokenizing character strings, including but not limited to non-delimited character strings of the type commonly used in Internet domain names and computer filenames, to accurately identify words and phrases occurring therein. In one embodiment, a phased tokenization approach is used in which the final phase is a lexical analysis-based tokenization using a dictionary. The dictionary may be advantageously created and updated based upon one or more query logs associated with respective information retrieval systems, thereby ensuring that the dictionary accurately reflects currently-used terminology and captures alternative spellings and presentations of words and phrases submitted by users.

20 Claims, 10 Drawing Sheets

(56) References Cited

U.S. PATENT DOCUMENTS

| | | |
|---|---|---|
| 8,301,437 B2 | 10/2012 | Parikh |
| 2003/0177112 A1* | 9/2003 | Gardner .......................... 707/3 |
| 2003/0187633 A1 | 10/2003 | Fairweather |
| 2004/0083091 A1 | 4/2004 | Ie et al. |
| 2004/0249801 A1 | 12/2004 | Kapur |
| 2005/0075859 A1 | 4/2005 | Ramsey |
| 2005/0080797 A1 | 4/2005 | Short |
| 2005/0125215 A1 | 6/2005 | Wu et al. |
| 2005/0187923 A1* | 8/2005 | Cipollone ........................ 707/3 |
| 2005/0197828 A1 | 9/2005 | Mcconnell et al. |
| 2005/0210017 A1* | 9/2005 | Cucerzan ........................ 707/3 |
| 2006/0106592 A1 | 5/2006 | Brockett et al. |
| 2006/0116862 A1 | 6/2006 | Carrier et al. |
| 2006/0155530 A1 | 7/2006 | Altevogt et al. |
| 2006/0271353 A1 | 11/2006 | Berkan et al. |
| 2007/0157086 A1* | 7/2007 | Drey .............................. 715/531 |
| 2008/0033982 A1* | 2/2008 | Parikh et al. ................... 707/102 |
| 2009/0083028 A1 | 3/2009 | Davtchev et al. |
| 2009/0144049 A1 | 6/2009 | Haddad et al. |
| 2009/0248422 A1 | 10/2009 | Li et al. |
| 2010/0023514 A1 | 1/2010 | Parikh |
| 2010/0100369 A1* | 4/2010 | Shetty et al. ...................... 704/4 |
| 2010/0131264 A1 | 5/2010 | Ljolje et al. |
| 2010/0198583 A1 | 8/2010 | Su et al. |
| 2010/0228538 A1 | 9/2010 | Yamada |
| 2010/0329437 A1 | 12/2010 | Jeffs et al. |
| 2011/0184718 A1 | 7/2011 | Chen |
| 2011/0249811 A1 | 10/2011 | Conway et al. |
| 2012/0150530 A1* | 6/2012 | Iida et al. ........................... 704/2 |

\* cited by examiner

TOKENIZATION PLATFORM

CROSS REFERENCE TO RELATED APPLICATION

This application is a continuation of U.S. patent application Ser. No. 12/178,775, filed Jul. 24, 2008, the entirety of which is incorporated by reference herein.

FIELD OF THE INVENTION

The present invention generally relates to automated systems and methods for tokenizing a string of characters to identify words and phrases occurring therein.

BACKGROUND

As used herein, the term "delimiter" refers to one or more characters that are used to specify a boundary between separate, independent words occurring in a string of characters. In some character strings, no delimiters are used to specify a boundary between words occurring within the string. Such non-delimited character strings are very commonly used in Internet domain names and computer filenames. An example of an Internet domain name that includes a non-delimited character string is "www.digitalcamerareview.com." In this domain name, the non-delimited character string "digitalcamerareview" includes the separate, independent words "digital," "camera" and "review." An example of a computer filename that includes a non-delimited character string is "catinthehat.gif." In this filename, the non-delimited character string "catinthehat" includes the separate, independent words "cat," "in," "the," and "hat." Each word identified within a non-delimited character string may have independent meaning. Furthermore, identified words taken together may have meaning, in which case they form a phrase.

A non-delimited character string that forms a part of an Internet domain name may include words or phrases that provide valuable clues about accessible subject matter within the corresponding Internet domain. If such words and phrases could be accurately identified, they could be used to improve the performance of Internet search engines or other systems that match keywords or other information submitted by a user to domains on the World Wide Web. Likewise, a non-delimited character string that forms a part of a computer filename may include words or phrases that provide valuable clues about the information contained in or represented by a file identified by the filename. If such words and phrases could be accurately identified, they could be used to improve the performance of search engines, desktop search tools, or other systems that match keywords or other information submitted by a user to computer files.

What is needed then is a system and method for tokenizing character strings, including but not limited to non-delimited character strings of the type commonly used in Internet domain names and computer filenames, to accurately identify words and phrases occurring therein.

BRIEF SUMMARY OF THE INVENTION

A tokenization platform and method is described herein for accurately tokenizing character strings, including but not limited to non-delimited character strings of the type commonly used in Internet domain names and computer filenames, to accurately identify words and phrases occurring therein.

In particular, a method for tokenizing a character string is described herein. In accordance with the method: (a) it is determined whether there are any words or phrases in a dictionary that match a series of characters within the character string that begins at the first character of the character string; (b) for each matching word or phrase identified in step (a), the matching word or phrase is assigned to a tokenization path, wherein the tokenization path comprises one or more contiguous words or phrases embedded within the character string, and a corresponding series of characters is removed from the beginning of the character string, thereby generating a shortened character string associated with the tokenization path or terminating the tokenization path; (c) if no matching word or phrase is identified in step (a), then any tokenization path with which the character string is associated is terminated; (d) steps (a), (b) and (c) are recursively performed for any shortened character string generated in step (b) until all tokenization paths are terminated; (e) for any tokenization path formed through the performance of steps (a)-(d), a score is calculated based on each word or phrase assigned to the tokenization path; and (f) the word(s) and/or phrase(s) associated with a tokenization path having the highest score are selected as tokens associated the character string.

A further method for tokenizing a character string is described herein. In accordance with the method, a dictionary is populated with words and phrases included in a set of search queries submitted by users of one or more information retrieval systems over a first predetermined time period. One or more series of characters within the character string are then identified that match a word or phrase populated within the dictionary. The foregoing method may further include periodically updating the dictionary with words and phrases included in additional sets of search queries submitted by users of the one or more information retrieval systems over predetermined time periods that are subsequent to the first predetermined time period.

A computer program product is also described herein. The computer program product comprises a computer-readable medium having computer program logic recorded thereon for enabling a processing unit to tokenize a character string. The computer program logic includes first means, second means, third means, fourth means, fifth means and sixth means. The first means are for enabling the processing unit to determine if there are any words or phrases in a dictionary that match a series of characters within the character string that begins at the first character of the character string. The second means are for enabling the processing unit to assign each matching word or phrase identified by the first means to a tokenization path, wherein the tokenization path comprises one or more contiguous words or phrases embedded within the character string, and to remove a corresponding series of characters from the beginning of the character string, thereby generating a shortened character string associated with the tokenization path or terminating the tokenization path. The third means are for enabling the processing unit to terminate any tokenization path with which the character string is associated if no matching word or phrase is identified by the first means. The fourth means are for enabling the processing unit to recursively perform the functions associated with the first means, the second means and the third means with respect to any shortened character string generated by the second means until all tokenization paths are terminated. The fifth means are for enabling the processing unit to calculate a score for any tokenization path formed by the execution of the first means, the second means, the third means and the fourth means based on each word or phrase assigned to the tokenization path. The sixth means are for enabling the processing unit to select the word(s) and/or phrase(s) associated with a tokenization path having the highest score as tokens associated the character string.

A further computer program product is described herein. The computer program product comprises a computer-readable medium having computer program logic recorded thereon for enabling a processing unit to tokenize a character string. The computer program logic includes first means and second means. The first means are for enabling the processing unit to populate a dictionary with words and phrases included in a set of search queries submitted by users of one or more information retrieval systems over a first predetermined time period. The second means are for enabling the processing unit to identify one or more series of characters within the character string that match a word or phrase populated within the dictionary. The computer program logic may further include means for enabling the processing unit to periodically update the dictionary with words and phrases included in additional sets of search queries submitted by users of the one or more information retrieval systems over predetermined time periods that are subsequent to the first predetermined time period.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
FIG. 1 is a block diagram of a tokenization platform in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Tokenization Platform in Accordance with an Embodiment of the Present Invention FIG. 1 is a block diagram of a tokenization platform 100 in accordance with an embodiment of the present invention. Generally speaking, tokenization platform 100 operates to receive a character string 102 and to identify one or more tokens 104 within the character string. Character string 102 may represent any discrete series of characters for which tokenization is to be performed. For example, character string 102 may comprise an Internet domain name or a computer filename, although these examples are not intended to be limiting. Token(s) 104 represents one or more separate characters sequences within character string 102 that have been identified by tokenization platform 100. A token may represent, for example, a character sequence within character string 102 that has been matched to a word or phrase by tokenization platform 100. A token may also represent other types of character sequences as well.

By way of example, tokenization platform 100 may receive a character string 102 corresponding to the Internet domain name "www.tarzanlordofthejungle.com" and identify the corresponding tokens 104: "www," "tarzan," "lord," "of," "the," "jungle" and "com." As another example, tokenization platform 100 may receive a character string 102 corresponding to the computer filename "mariasaintsunglasshr031.jpg" and identify the corresponding tokens 104: "maria," "saint," "sunglass," "hr," "031," and "jpg."

Depending upon the implementation, tokenization platform 100 may be implemented in software, through the execution of program instructions by one or more general purpose or special-purpose processors, in hardware using analog and/or digital circuits, or as a combination of software and hardware. An example of a computer system that may be used to implement a software-based implementation of tokenization platform 100 will be described below in reference to FIG. 12.

Each character in character string 102 may be encoded with a character encoding scheme such as ASCII (American Standard Code for Information Interchange) or UTF-8 (8-bit Universal Character Set/Unicode Transformation Format) to facilitate automated processing of the string by tokenization platform 100. Likewise, each character in the token(s) 104 may be encoded using such a character encoding scheme.

Figure 2:
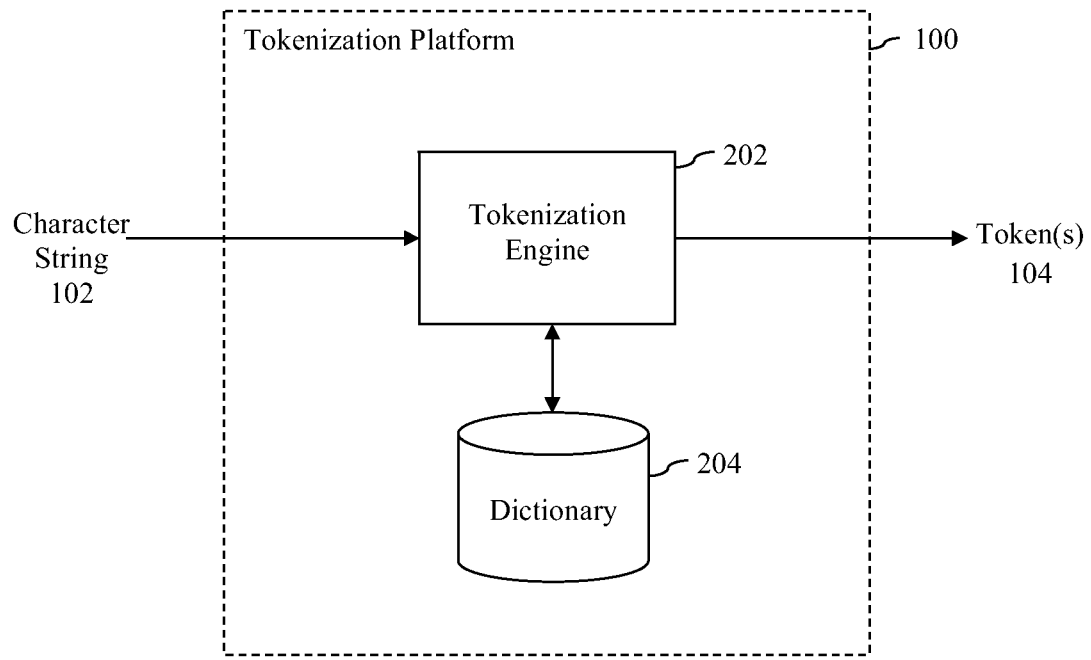
FIG. 2 is a block diagram that illustrates various elements of the tokenization platform of FIG. 1 in accordance with one embodiment of the present invention.

FIG. 2 is a block diagram that illustrates various elements of tokenization platform 100 of FIG. 1 in accordance with one embodiment of the present invention. As shown in FIG. 2, tokenization platform 100 includes a tokenization engine 202 and a dictionary 204 communicatively coupled thereto. Dictionary 204 includes a structured collection of words and phrases. As used herein, the term "phrase" refers to a series of two or more words. Tokenization engine 202 is configured to receive a character string 102 and to identify one or more tokens 104 within the character string. To perform this function, tokenization engine 202 is configured to compare character sequences within character string 102 to words and phrases stored in dictionary 204 in a manner that will be described in more detail below.

Figure 3:
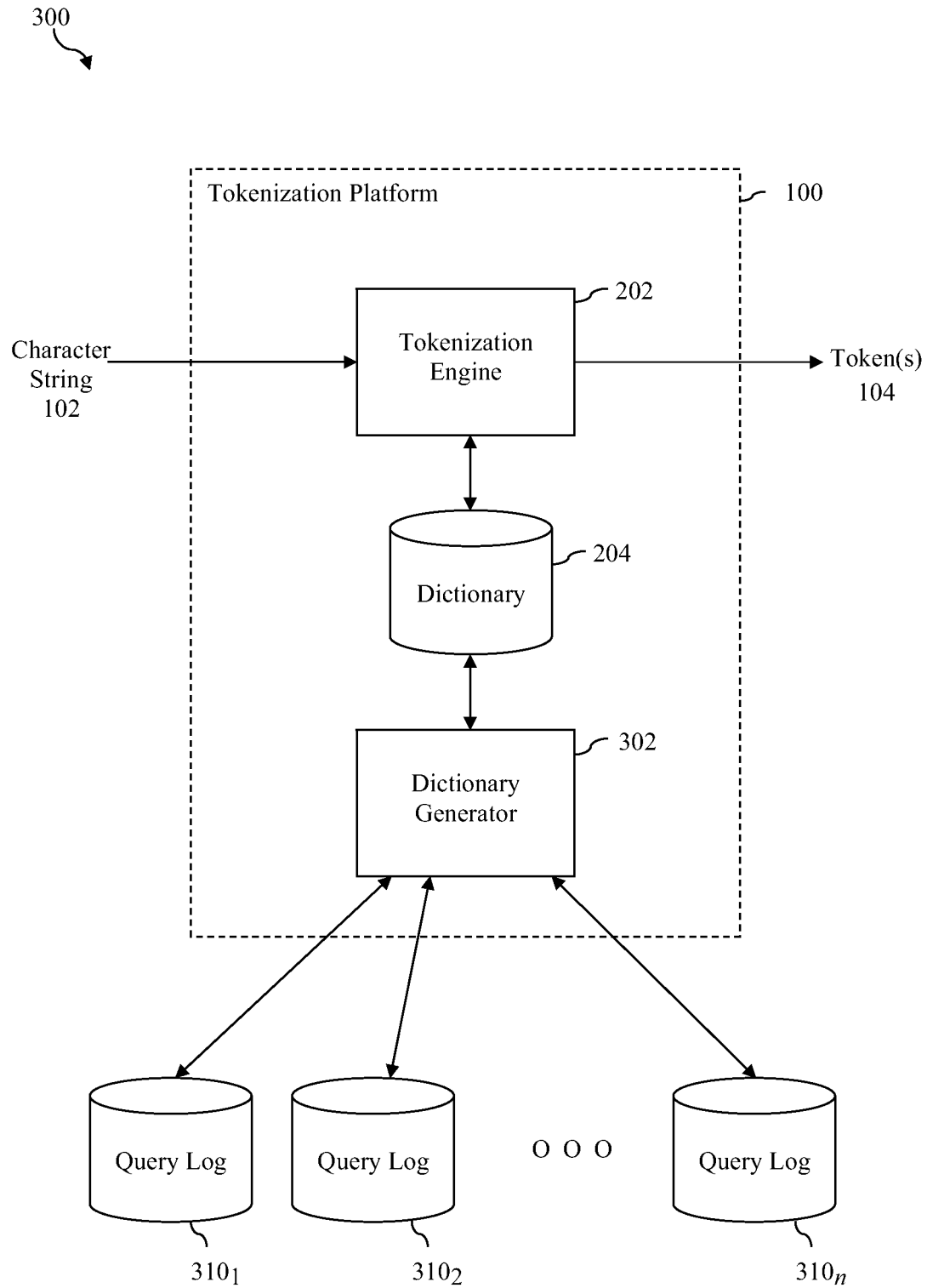
FIG. 3 depicts a system in accordance with an embodiment of the present invention in which a tokenization platform is configured to populate a dictionary with words and phrases derived from a plurality of query logs.

FIG. 3 depicts a system 300 in which tokenization platform 100 is configured to populate dictionary 204 with words and phrases derived from a plurality of query logs $310_1$, $310_2$, ..., $310_n$. Each of query logs $310_1$, $310_2$, ..., $310_n$ is intended to represent a stored set of search queries submitted by users of a corresponding information retrieval system (not shown in FIG. 3) over some predetermined time period. As will be appreciated by persons skilled in the relevant art(s), a search query typically comprises one or more keywords input by a user for the purpose of locating desired resources made available to the user by an information retrieval system. In system 300, tokenization platform 100 includes a dictionary generator 302 that extracts words and phrases from the search queries stored in each of query logs $310_1$, $310_2$, ..., $310_n$ and stores such words and phrases in dictionary 204.

In one embodiment, dictionary generator 302 also calculates or otherwise obtains a frequency for each word and phrase stored in dictionary 204. The frequency associated with a particular word or phrase may represent the total number of times the particular word or phrase appears within a distinct search query stored in query logs $310_1$, $310_2$, ..., $310_n$ divided by the total number of distinct search queries stored within those logs. However, this is only an example and persons skilled in the relevant art(s) will appreciate that numerous other methods for obtaining a frequency associated with a word or phrase may be used. In one embodiment, dictionary generator 302 will only store a phrase within dictionary 204 if the frequency associated with the phrase exceeds a predetermined threshold.

Figure 4:
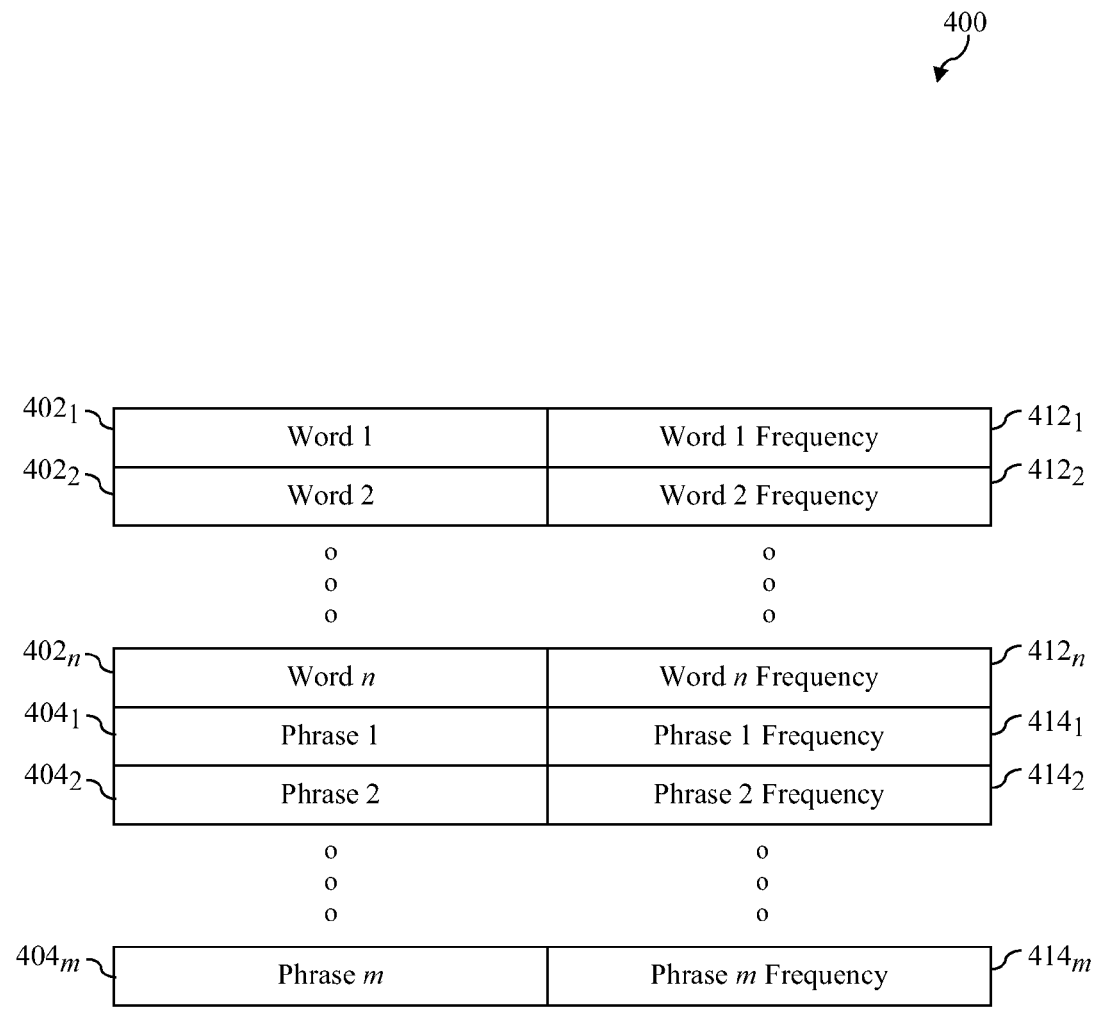
FIG. 4 depicts an example logical structure of dictionary used by a tokenization platform in accordance with one embodiment of the present invention.

FIG. 4 depicts an example logical structure 400 of dictionary 204 in accordance with one embodiment of the present invention. In accordance with logical structure 400, dictionary 204 includes a plurality of words $402_1$, $402_2$, ..., $402_n$ and corresponding word frequencies $412_1$, $412_2$, ..., $412_n$ associated therewith. Furthermore, dictionary 204 includes a plurality of phrases $404_1$, $404_2$, ..., $404_m$ and corresponding phrase frequencies $414_1$, $414_2$, ..., $414_m$ associated therewith. Logical structure 400 is provided by way of example only and persons skilled in the relevant art(s) will appreciate that a wide variety of logical structures may be used to store words and phrases, and frequencies associated therewith, in dictionary 204.

In one embodiment of the present invention, dictionary generator 302 is configured to periodically update dictionary 204 based on new sets of search queries stored in query logs $310_1$, $310_2$, ..., $310_n$. The new sets of search queries may also be stored within different query logs than query logs $310_1$, $310_2$, ..., $310_n$, depending upon the implementation. This process may involve replacing all of the words and phrases stored in dictionary 204 with new words and phrases derived from the new sets of search queries. Alternatively, this process may involve deleting a subset of the words and phrases stored in dictionary 204 while also adding a new set of words and phrases to dictionary 204. In either case, dictionary generator 302 may calculate or otherwise obtain new frequencies to be associated with the words and phrases stored in dictionary 204 as part of the update process.

In accordance with such an embodiment, each update of dictionary 204 introduces new words and phrases derived from search queries submitted by users over a predetermined time period, wherein the predetermined time period is more recent than (and subsequent to) a predetermined time period associated with a previous set of search queries used to populate dictionary 204. This process advantageously ensures that the words and phrases stored in dictionary 204 accurately reflect more currently-used terminology, including newly-coined words and phrases and words and phrases associated with current events. This process also advantageously ensures that alternative spellings and presentations of words and phrases submitted by users may be captured within dictionary 204. Furthermore, because the process also associates a frequency of use with such words and phrases, it provides a constantly-updated measure of which words and phrases are currently most popular with users. Such dynamic dictionary generation based on recently-submitted user search queries provides for more accurate tokenization of character strings and presents a distinct advantage as compared to the user of static dictionaries that do not change over time.

Query logs $310_1$, $310_2$, ..., $310_n$ may be associated with a variety of different information retrieval systems and/or sub-systems. The generation of dictionary 204 based on query logs associated with a variety of different information retrieval systems and/or sub-systems may ensure that dictionary 204 includes a broad variety of words and phrases that derive from a variety of different information areas. For example, in one embodiment, query logs $310_1$, $310_2$, ..., $310_n$ include one or more of: a query log associated with an information retrieval system configured to retrieve Web pages, a query log associated with an information retrieval system configured to retrieve images, and a query log associated with an information retrieval system configured to retrieve news content. In a particular embodiment, query logs $310_1$, $310_2$, ..., $310_n$ include a query log representative of search queries submitted to a Web search engine (such as YAHOO! SEARCH) from the United States over a one-week period, a query log representative of search queries submitted to an Internet image search engine (such as YAHOO! IMAGE SEARCH) over a one-month period, a query log representative of search queries submitted to an Internet news search engine (such as YAHOO! NEWS SEARCH) over a one-month period, and a query log representative of search queries submitted to a Web search engine from the United Kingdom, Asia, Germany, France, Australia and New Zealand over a one month period. Such an implementation may be used to generate a dictionary 204 that comprises approximately 1.5 million keywords. However, this is only one example and should not be used to limit the present invention.

It is noted that dictionaries other than those derived from query logs may also be used to implement the present invention, provided such other dictionaries provide some sort of frequency associated with each word or phrase stored therein. In an embodiment in which the dictionary is derived from a corpus of documents (such as a corpus of indexed Web pages), a term frequency-inverse document frequency (TF-IDF) may be associated with each word or phrase.

Figure 5:
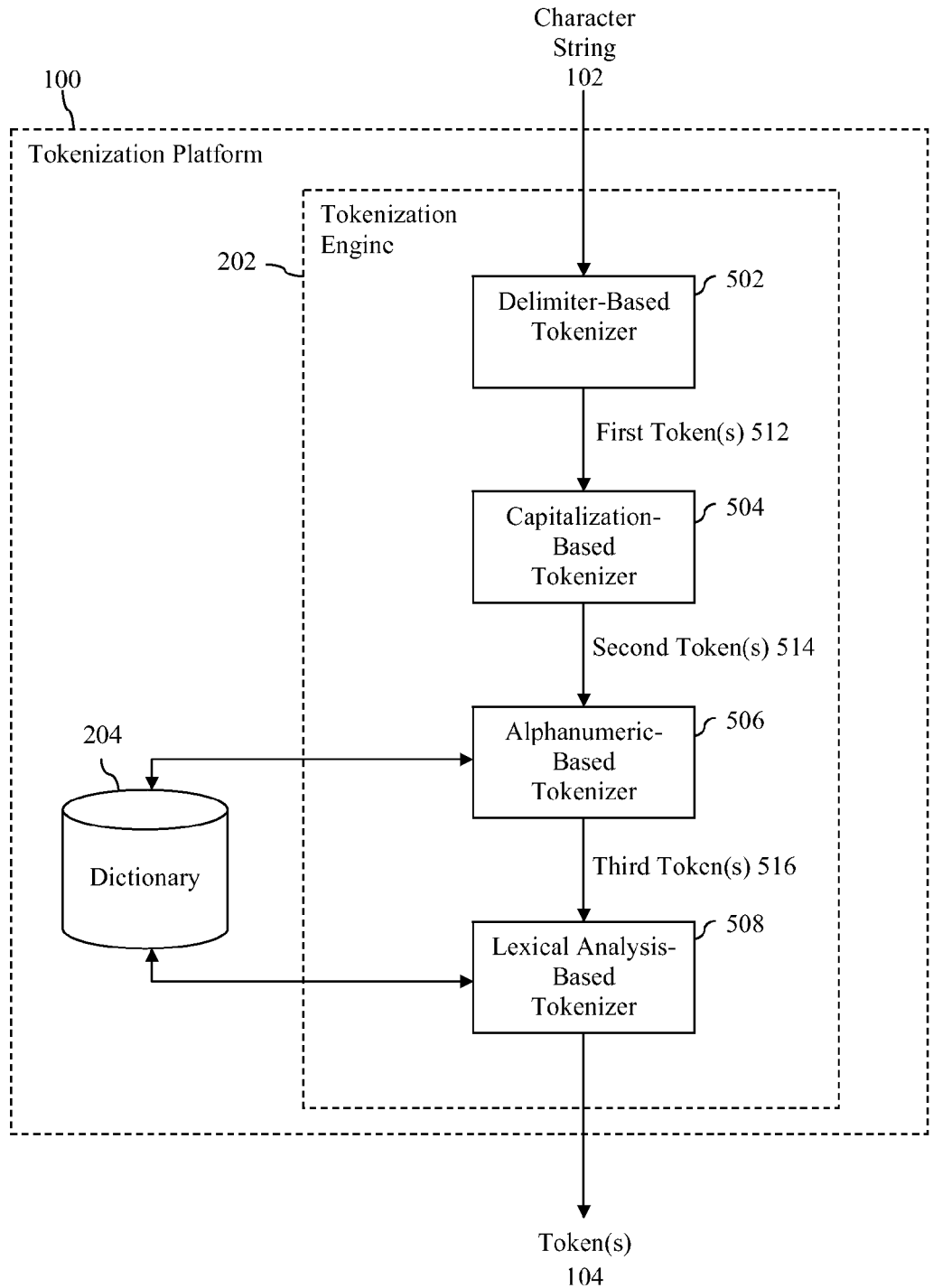
FIG. 5 is a block diagram of a tokenization platform in accordance with an embodiment of the present invention in which a tokenization engine applies a phased tokenization technique to identify one or more tokens based on a character string.

1. Phased Tokenization Technique in Accordance with an Embodiment of the Present Invention FIG. 5 is a block diagram of one implementation of tokenization platform 100 in which tokenization engine 202 applies a phased tokenization technique to identify token(s) 104 based on character string 102. As shown in FIG. 5, tokenization engine 202 includes a series of logic blocks that are collectively configured to implement such a phased tokenization approach. These logic blocks include a delimiter-based tokenizer 502, a capitalization-based tokenizer 504, an alphanumeric-based tokenizer 506, and a lexical analysis-based tokenizer 508. Alphanumeric-based tokenizer 506 and lexical analysis-based tokenizer 508 are each configured to access dictionary 204 to perform a respective tokenization function. The manner in which each of these logic blocks operate to collectively implement a phased tokenization approach will now be described in reference to flowchart 600 of FIG. 6.

Figure 6:
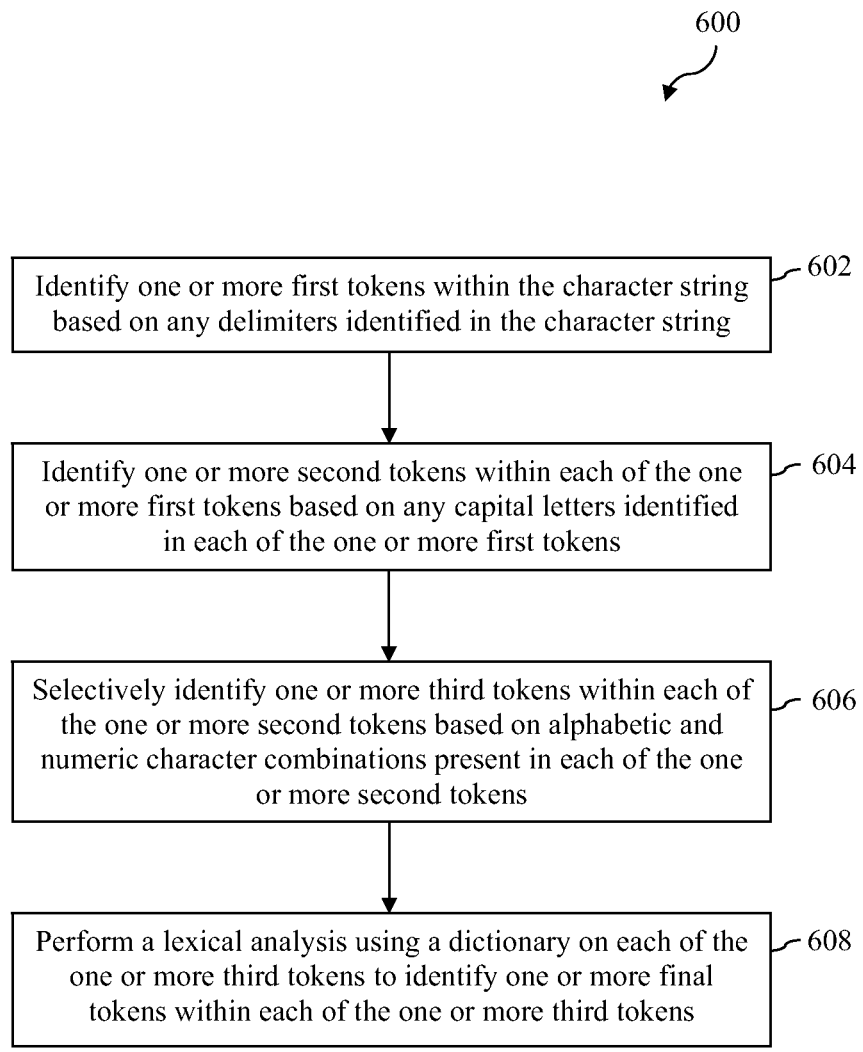
FIG. 6 depicts a flowchart of a phased tokenization technique for identifying one or more tokens based on a character string in accordance with an embodiment of the present invention.

As shown in FIG. 6, the method of flowchart 600 begins at step 602 in which delimiter-based tokenizer 502 receives input character string 102 and identifies one or more first tokens within character string 102 based on any delimiters identified in the character string. As noted in the Background Section, a delimiter refers to one or more characters that are used to specify a boundary between separate, independent words occurring in a string of characters. Some commonly-used delimiters include periods ("."), hyphens ("-"), forward slashes ("/"), backward slashes ("\"), commas (","), underscores ("_"), exclamation marks ("!"), and the like. Thus, for example, delimiter-based tokenizer 502 may receive the character string "team-building.jpg" and identify the first tokens "team," "building," and "jpg" based on the hyphen and period present within the character string.

Any token(s) identified in this manner by delimiter-based tokenizer 502 are passed to capitalization-based tokenizer 504. Such token(s) are represented in FIG. 5 as first token(s) 512. If delimiter-based tokenizer 502 cannot detect any delimiters within character string 102, then it will pass the entire character string as a single first token 512 to capitalization-based tokenizer 504.

At step 604, capitalization-based tokenizer 504 receives first token(s) 512 and identifies one or more second tokens within each of first token(s) 512 based on any capital letters identified in each of first token(s) 512. Thus, for example, capitalization-based tokenizer 504 may receive the first token "LordOfTheRings" and identify the second tokens "lord," "of," "the" and "rings" based on the capital letters "L," "O," "T" and "R" present within the first token.

Any token(s) identified in this manner by capitalization-based tokenizer 504 are passed to alphanumeric-based tokenizer 506. Such token(s) are represented in FIG. 5 as second token(s) 514. If capitalization-based tokenizer 504 cannot detect any capital letters within a first token 512, then it will pass the entire first token 512 as a single second token 514 to alphanumeric-based tokenizer 506.

At step 606, alphanumeric-based tokenizer 506 receives second token(s) 514 and selectively identifies one or more third tokens within each of second token(s) 514 based on alphabetic and numeric character combinations present in each of second token(s) 514. In particular, alphanumeric-based tokenizer 506 examines each second token 514 to determine if it comprises a character combination in which one or more letters are followed by one or more numbers or vice versa. Such character combinations might include, for example, the strings "picture1," "chapter3," "U2," or "49ers."

Figure 7:
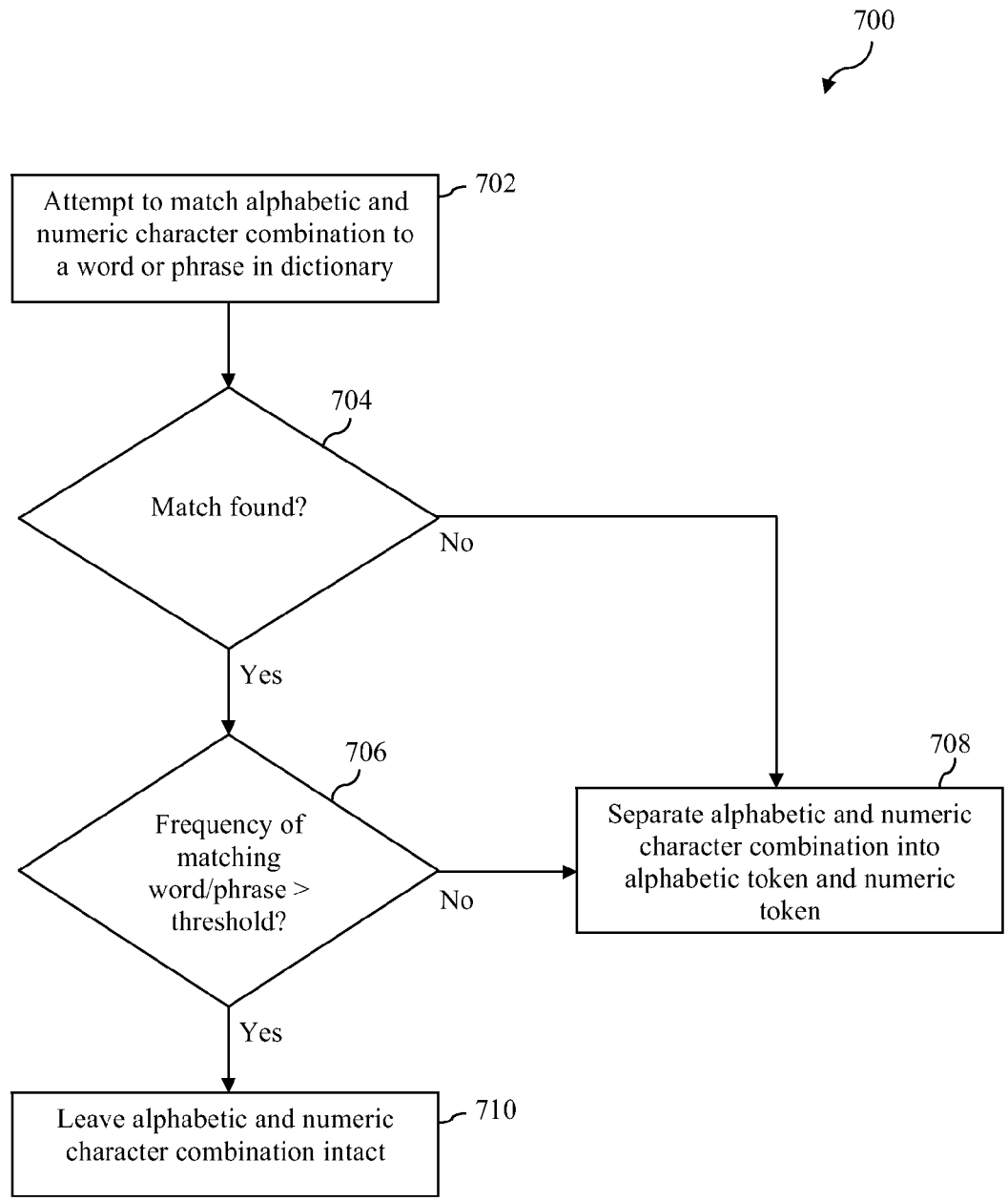
FIG. 7 depicts a flowchart for performing selective alphanumeric-based tokenization in accordance with one embodiment of the present invention.

For each second token 514 so identified, alphanumeric-based tokenizer 506 performs a process that will now be described with reference to flowchart 700 of FIG. 7. As shown in FIG. 7, at step 702, alphanumeric-based tokenizer 506 attempts to match the alphabetic and numeric character combination to a word or phrase in dictionary 204 and, at decision step 704, determines whether a match is found. If no match is found, then alphanumeric-based tokenizer 506 will separate the identified alphabetic and numeric character combination into an alphabetic token and a numeric token as shown at step 708. Thus, for example, if alphanumeric-based tokenizer 506 could not match the second token "picture1" to an entry in dictionary 204, it would separate the second token into third tokens "picture" and "1."

However, if alphanumeric-based tokenizer 506 does find a match for the identified alphabetic and numeric character combination in dictionary 204, then alphabetic-based tokenizer 506 will determine if the frequency associated with the matching word or phrase exceeds a predefined threshold as shown at decision step 706. If the frequency associated with the matching word or phrase does not exceed the predefined threshold, then alphanumeric-based tokenizer 506 will separate the identified alphabetic and numeric character combination into an alphabetic token and a numeric token as shown at step 708. However, if the frequency associated with the matching word or phrase does exceed the predefined threshold, then alphanumeric-based tokenizer 506 will leave the identified alphabetic and numeric character combination intact as shown at step 710. Thus, for example, if alphanumeric-based tokenizer 506 could match the second token "U2" to an entry in dictionary 204 and the frequency associated with the entry "U2" in dictionary 204 exceeded a predefined threshold, alphanumeric-based tokenizer 506 would leave the second token "U2" intact. This technique advantageously ensures that valid alphanumeric tokens are not separated by alphanumeric-based tokenizer 506.

Any token(s) identified in the foregoing manner by alphanumeric-based tokenizer 506 are passed to lexical analysis-based tokenizer 508. Such token(s) are represented in FIG. 5 as third token(s) 514. If alphanumeric-based tokenizer 506 does not separate any alphabet and numeric character combinations within a second token 514, then it will pass the entire second token 514 as a single third token 516 to lexical analysis-based tokenizer 508.

Returning now to the description of flowchart 600 of FIG. 6, at step 608, lexical analysis-based tokenizer 508 receives third token(s) 514 and performs a lexical analysis using dictionary 204 on each of third token(s) 514 to identify one or more final tokens within each of the third token(s). One manner by which lexical analysis-based tokenizer 508 operates to perform this function will be described in detail in the following sub-section. Any token(s) identified in the manner to be described are passed from lexical analysis-based tokenizer 508 as token(s) 104.

Figure 8:
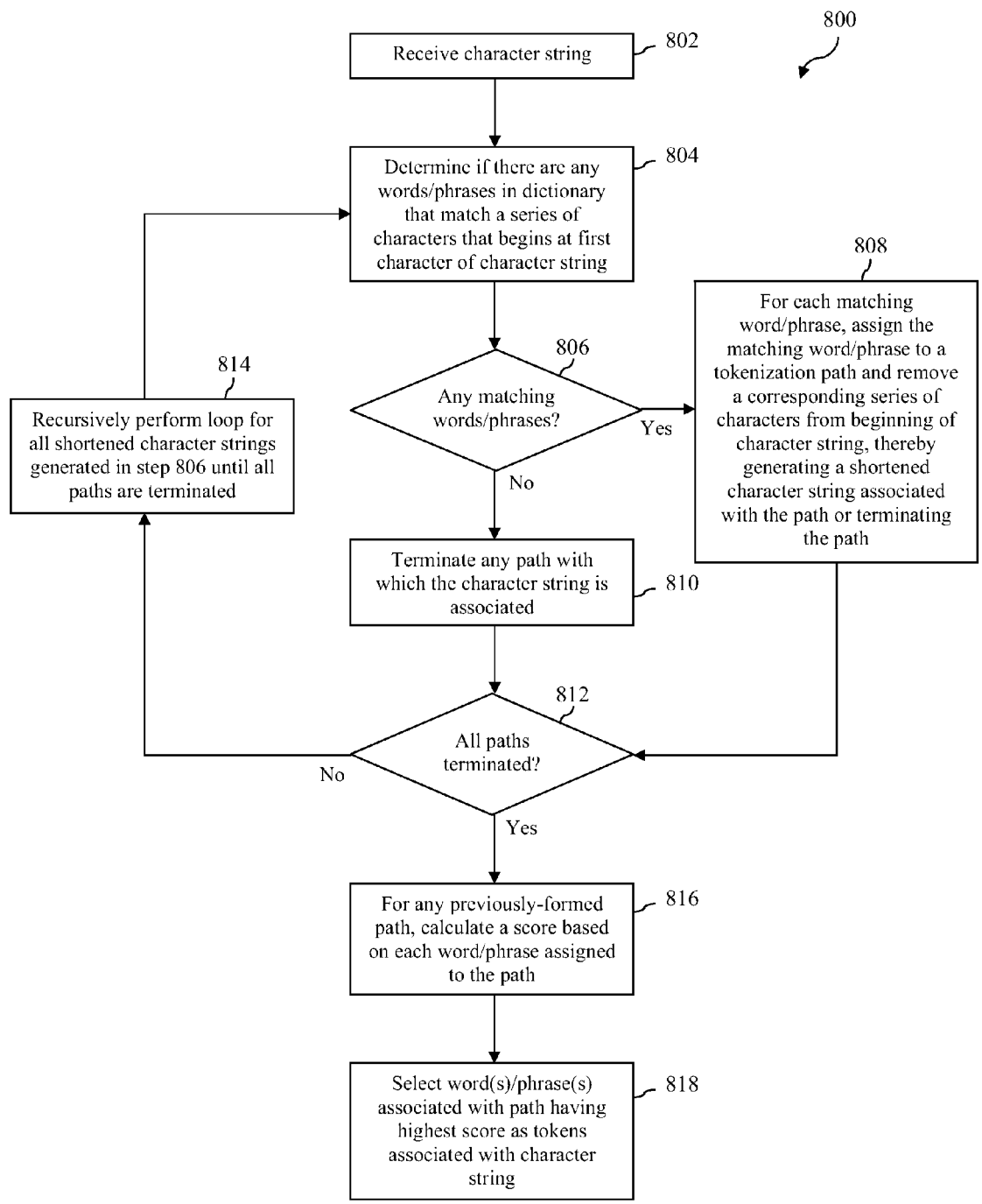
FIG. 8 depicts a flowchart of a method for performing lexical analysis-based tokenization using a dictionary in accordance with one embodiment of the present invention.

2. Lexical Analysis-Based Tokenization in Accordance with an Embodiment of the Present Invention FIG. 8 depicts a flowchart 800 of a method for performing lexical analysis-based tokenization using a dictionary in accordance with one embodiment of the present invention. The method of flowchart 800 may be implemented by lexical analysis-based tokenizer 508 as part of a phased tokenization approach described above in reference to FIGS. 5 and 6, although the invention is not so limited. Persons skilled in the relevant art(s) will readily appreciate that the method of flowchart 800 may be performed in conjunction with tokenization functions other than those described above in reference to FIGS. 5 and 6 and may also be performed independently of any other tokenization functions.

As shown in FIG. 8, the method of flowchart 800 begins at step 802, in which lexical analysis-based tokenizer 508 receives a character string. The character string may be, for example, a third token 516 passed to lexical analysis-based tokenizer 508 from alphanumeric-based tokenizer 506, although the method is not so limited.

At step 804, lexical analysis-based tokenizer 508 determines if there are any words or phrases within dictionary 204 that match a series of characters within the character string that begins at the first of the character string.

As shown at decision step 806, if it is determined that there are any matching words or phrases, then control flows to step 808. At step 808, for each matching word or phrase, lexical analysis-based tokenizer 508 assigns the matching word or phrase to a tokenization path and removes a corresponding series of characters from the beginning of the character string. The removal of the corresponding series of characters from the beginning of the character string will either generate a shortened character string associated with the tokenization path if all the remaining letters in the original character string are not consumed by the removal, or terminate the tokenization path if all the remaining letters in the original character string are consumed.

As further shown at decision step 806, if no matching words or phrases are identified during step 804, then any tokenization path with which the character string is associated is terminated as shown at step 810.

After the conclusion of both step 808 and step 810, control flows to decision step 812 in which lexical analysis-based tokenizer 508 determines whether all previously-formed tokenization paths have been terminated. If lexical analysis-based tokenizer 508 determines that not all previously-formed tokenization paths have been terminated, then lexical analysis-based tokenizer 508 recursively performs the logic in the loop comprising steps 804, 806, 808, 810 and 812 for each shortened character string generated in step 806 until all previously-formed tokenization paths have been terminated as shown at step 814.

However, if lexical analysis-based tokenizer 508 determines at decision step 812 that all previously-formed tokenization paths have been terminated then control flows to step 816. During step 816, lexical analysis-based tokenizer 508 calculates a score for any previously-formed and terminated tokenization path. The score for each tokenization path is calculated based on each word/phrase assigned to the path.

For example, in one embodiment, lexical analysis-based tokenizer 508 calculates the score for a tokenization path by calculating a value for each word or phrase assigned to the path in accordance with the formula:

$$\log(\text{frequency}*10)+(\text{length}+\text{frequency}/10)^2$$

wherein frequency represents a frequency associated with the word or phrase and length represents the length in characters of the word or phrase. Lexical analysis-based tokenizer 508 then sums the values so calculated for each word or phrase assigned to the tokenization path to calculate the overall score for the path. The foregoing scoring technique takes into account both the frequency of words and phrases appearing in a tokenization path as well as the length of such words or phrases appearing in the path. This is desirable since longer words and phrases typically will have a lower associated frequency. The foregoing scoring technique also has the effect of penalizing tokenization paths that have unmatched characters at the end of the string. The foregoing approach to scoring tokenization paths is provided by way of example only. Persons skilled in the relevant art(s) will appreciate that other scoring functions may be used to practice the method.

At step 818, lexical analysis-based tokenizer 508 selects the word(s) and/or phrase(s) associated with the tokenization path having the highest score as the tokens associated with the character string originally received in step 802.

Figure 9:
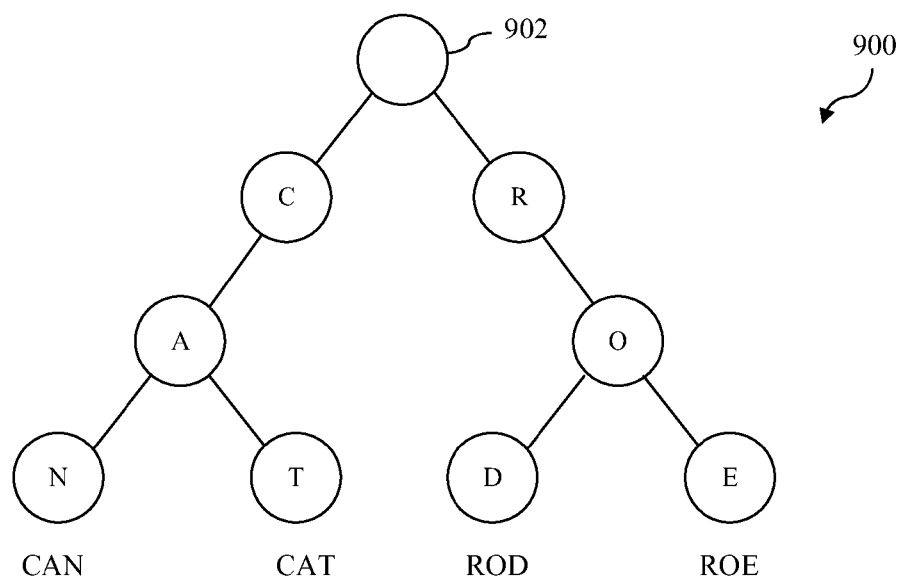
FIG. 9 illustrates the logical structure of a simple prefix tree.

In one embodiment of the present invention, in order to facilitate the matching operation of step 804, each word and phrase in dictionary 204 is stored in a prefix tree, which also may be referred to as a trie. As will be appreciated by persons skilled in the relevant art(s), a prefix tree is an ordered tree data structure can be used to store an associative array in which the keys are characters strings. By way of example, FIG. 9 depicts a simple prefix tree 900 that stores the words "CAN," "CAT," "ROD" and "ROE." Unlike a binary search tree, no node in prefix tree 900 stores the word associated with that node. Instead, the position of a node within tree 900 shows which word it is associated with. All the descendants of one node have a common prefix of the string associated with that node, and the root of the tree (denoted root 902) is associated with the empty string. As will be appreciated by persons skilled in the art, a prefix tree that stores all the words and phrases of dictionary 204 may include many more nodes than shown in prefix tree 900.

In an embodiment in which all the words and phrases in dictionary 204 are stored in a prefix tree, step 804 comprises traversing the prefix tree starting with the first character in the relevant character string and proceeding from node to node based on the sequence of characters in the character string until all matching words and phrases within the prefix tree are found. Using a prefix tree to perform the matching process of step 804 increases the speed with which that step may be performed.

Figure 10:
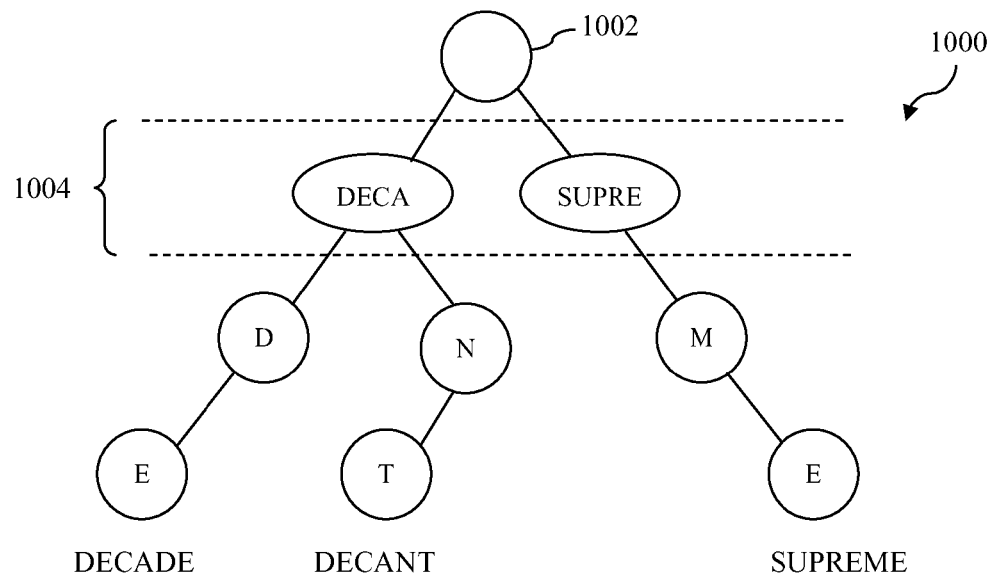
FIG. 10 illustrates the logical structure of a simple prefix tree in which nodes immediately below a root of the prefix tree store 4- and 5-letter prefixes.

In one embodiment, a special prefix tree structure is used in which the nodes that occur immediately below the root level of the prefix tree are populated with 4- and 5-lettered prefixes of words and phrases occurring in dictionary 204 in order to expedite the matching process. By way of example, FIG. 10 depicts a simple prefix tree 1000 in which the four letter prefix "DECA" and the five letter prefix "SUPRE" are stored in nodes that are at a level 1004 immediately below the root 1002 of prefix tree 1000. The 4-letter prefix "DECA" forms part of the words "DECADE" and "DECANT" stored in prefix tree 1000 and the 5-letter prefix "SUPRE" forms part of the word "SUPREME" stored in prefix tree 1000. As will be appreciated by persons skilled in the art, a prefix tree that stores all the words and phrases of dictionary 204 would include many more nodes than shown in prefix tree 1000.

Figure 11:
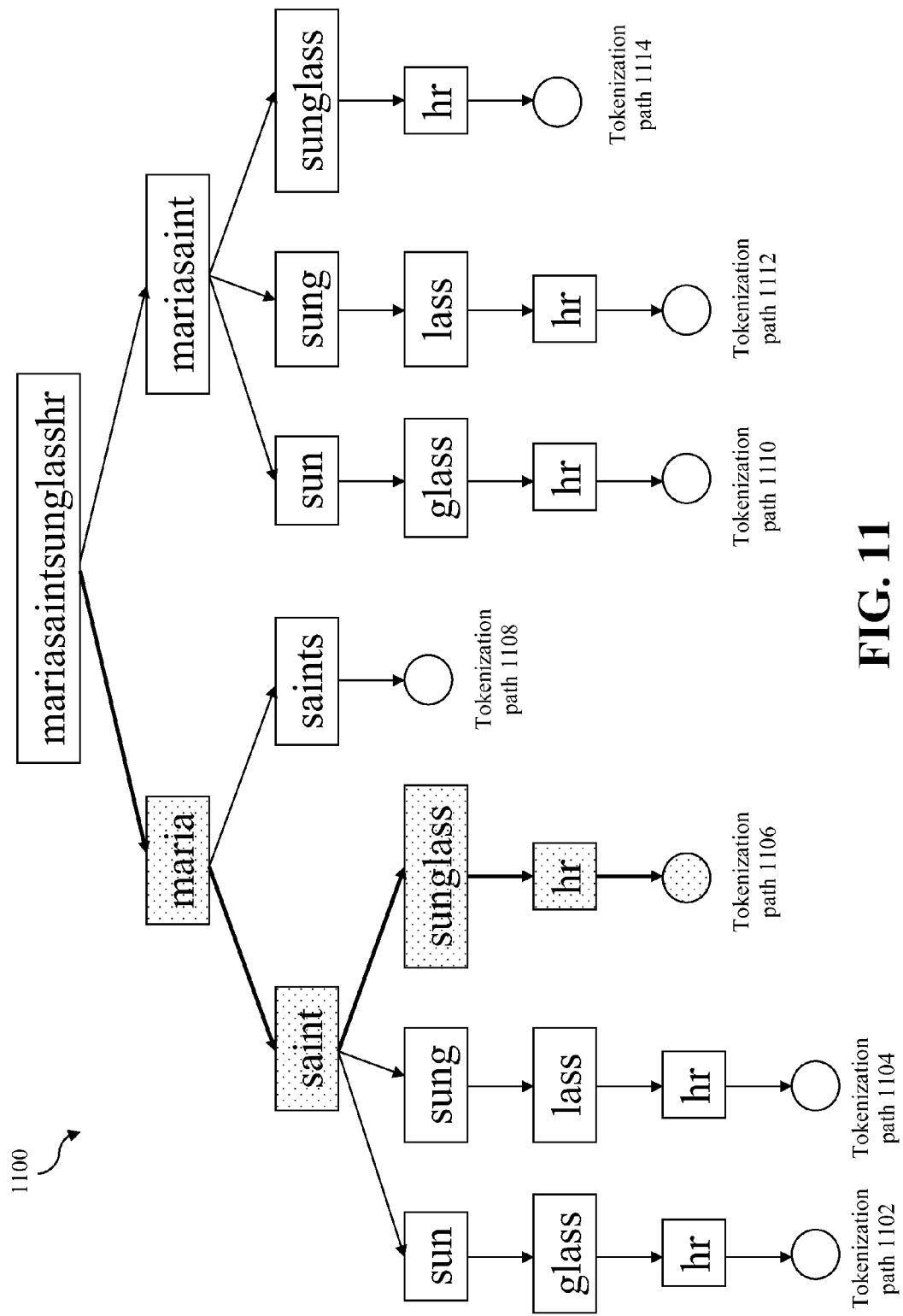
FIG. 11 is an illustration of multiple tokenization paths that may be formed through the application of a lexical analysis-based tokenization process to the input character string "mariasaintsunglasshr" in accordance with one embodiment of the present invention.

FIG. 11 is an illustration 1100 of multiple tokenization paths (namely, tokenization paths 1102, 1104, 1106, 1108, 1110, 1112 and 1114) that may be formed through the application of the tokenization process of flowchart 800 to the input character string "mariasaintsunglasshr" in accordance with one embodiment of the present invention. The manner in which the tokenization paths shown in FIG. 11 were formed will now be described with further reference to the tokenization process of flowchart 800, so that that process may be better understood.

At step 802, lexical analysis-based tokenizer 508 receives the character string "mariasaintsunglasshr."

At step 804, lexical analysis-based tokenizer 508 determines if there are any words or phrases within dictionary 204 that match a series of characters within "mariasaintsunglasshr" beginning with the first character "m" of that character string. In one embodiment, this step may involve traversing a prefix tree that stores the words and phrases of dictionary 204, wherein a first level of nodes below a root of the prefix tree include 4- or 5-letter prefixes. In such an embodiment, words and phrases within dictionary 204 that start with the prefix "mari" and "maria" would be targeted for the search.

As shown in FIG. 11, during step 804, lexical analysis-based tokenizer 508 finds the matching words "maria" and "mariasaint" within dictionary 204. Thus, at decision step 806, control flows to step 808, during which lexical analysis-based tokenizer 508 assigns each of these words to a tokenization path and removes a corresponding series of characters from the beginning of the character string "mariasaintsunglasshr." This results in the generation of the shortened character string "saintsunglasshr" in association with the tokenization path ["maria"] and the generation of the shortened character string "sunglasshr" in association with the tokenization path ["mariasaint"].

At decision step 812, it is determined that the tokenization paths ["maria"] and ["mariasaint"] have not been terminated, so control flows to step 814, in which the loop comprising steps 804, 806, 808, 810 and 812 is recursively performed for each shortened character string generated in step 806 (namely "saintsunglasshr" and "sunglass hr") until all previously-formed tokenization paths have been terminated. For the sake of brevity, each iteration of this loop will not be described; however, the generation of certain tokenization paths will be described to facilitate understanding of the process.

For example, with respect to the tokenization path ["maria"], the application of the foregoing loop results in the matching of the words "saint" and "saints" from dictionary 204 to sequences of characters at the beginning of the shortened character string "saintsunglasshr" and the assignment of these matching words to the respective tokenization paths ["maria", "saint"] and ["maria", "saints"]. For the tokenization path ["maria", "saint"], the shortened character string "sunglasshr" is now subject to further loop iterations of the loop, resulting in the ultimate formation of tokenization paths 1102, 1104 and 1106. However, for the tokenization path ["maria", "saints"], the shortened character string "unglasshr" cannot be matched to any words or phrases in dictionary 204, resulting in termination of that tokenization path, which is denoted tokenization path 1108. Termination of a path is indicated by a circle in FIG. 11. Depending upon the scoring technique used, the termination of tokenization path 1108 with left-over letters "unglasshr" can result in a penalty being applied to the score subsequently calculated for path 1108 during step 816. With the exception of tokenization path 1108, all of the other tokenization paths shown in FIG. 11 end with the assignment of the final word "hr", thereby consuming all the letters in the original character string and terminating those paths.

Once all tokenization paths have been terminated, they are scored during step 816. As discussed above, the score for each tokenization path may be calculated based on a frequency associated with each word or phrase assigned to the path and a length associated with each word or phrase assigned to the path. At step 818, the word(s) and/or or phrase(s) in the tokenization path receiving the highest score are selected as the tokens associated with the string "mariasaintsunglasshr." In FIG. 11, it is assumed that highlighted tokenization path 1106 has received the highest score. Therefore, the selected tokens will be "maria," "saint," "sunglass" and "hr."

C. Example Applications

The various systems and methods described above for performing tokenization of a character string may advantageously be used to support or improve a variety of applications. For example, by accurately tokenizing Internet domain names, an embodiment of the present invention can identify words and phrases that can be used by an information retrieval system, such as an Internet search engine, to match user-submitted queries to domains on the World Wide Web. Likewise, by accurately tokenizing computer filenames, an embodiment of the present invention can provide words and phrases that can be used by an information retrieval system to match user-submitted queries to files (such as, for example, image files) available on the World Wide Web.

Yet another example of an application that may utilize an embodiment of the present invention is a desktop search tool. In particular, by accurately tokenizing computer filenames, an embodiment of the present invention can identify words and phrases that can be used by a desktop search tool to match user-submitted keywords to files stored on or otherwise accessible to a computer.

Another example of an application that may utilize an embodiment of the present invention is a domain match service that automatically generates Web pages for a user when the user types an invalid domain name into his/her Web browser. Such a domain match service may attempt to include advertisements, links or other content of interest to the user within the automatically-generated Web page based on the invalid domain name input by the user. By accurately tokenizing the invalid domain name to identify words and phrases therein, an embodiment of the present invention can provide the domain match service with keywords that can be used to help identify relevant content for inclusion within the automatically-generated Web page.

The foregoing applications have been identified by way of example only. Persons skilled in the relevant art(s) will appreciate that many other applications may benefit from the features of the embodiments of the present invention described herein.

D. Example Computer System Implementation

The elements of tokenization platform 100 as depicted in FIGS. 1, 2, 3 and 5 and the methods of flowcharts 600, 700 and 800 as respectively depicted in FIGS. 6, 7 and 8 may each be implemented by a processor-based computer system. An example of such a computer system 1200 is depicted in FIG. 12.

Figure 12:
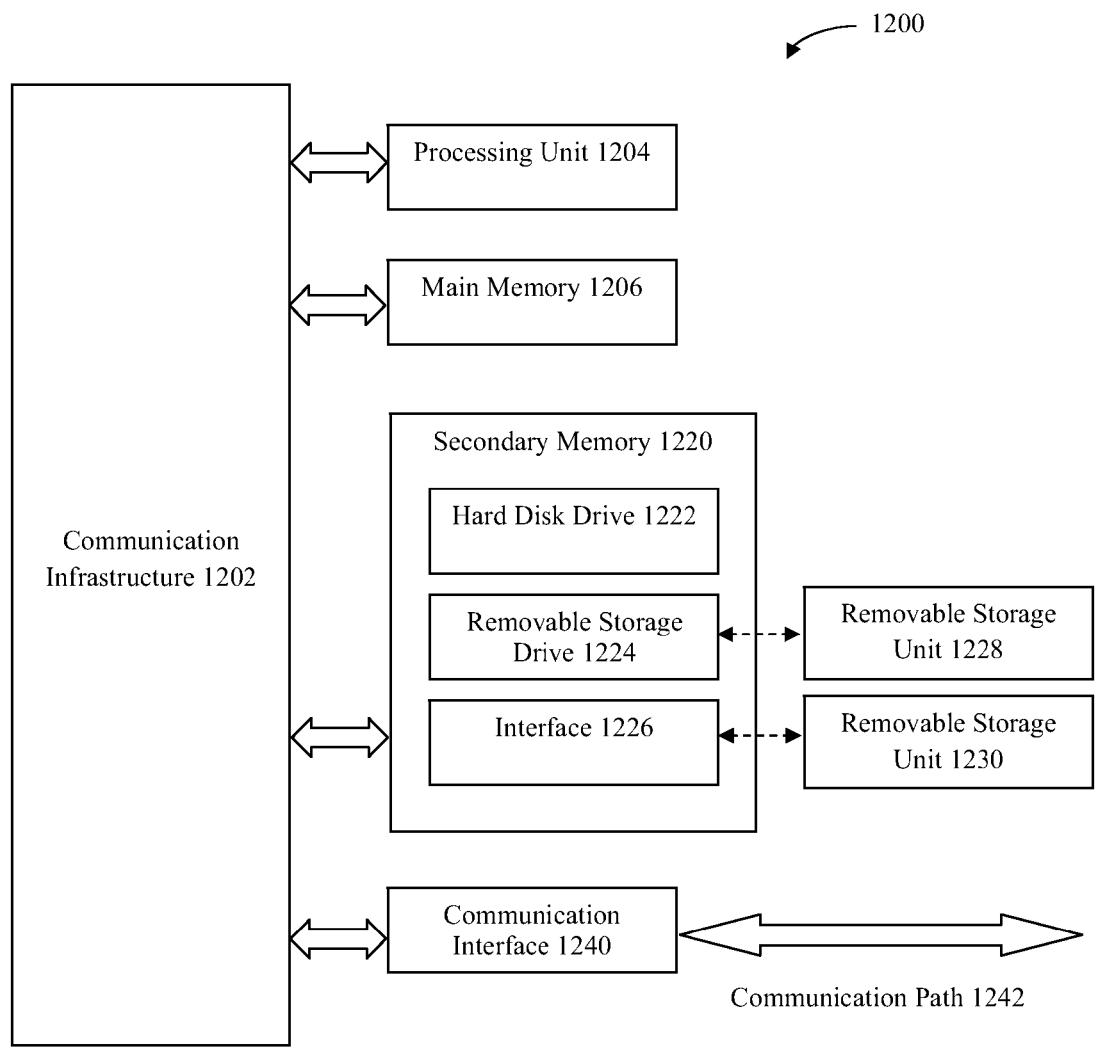
FIG. 12 is a block diagram of a computer system that may be used to implement one or more aspects of the present invention.

As shown in FIG. 12, computer system 1200 includes a processing unit 1204 that includes one or more processors.

Processor unit 1204 is connected to a communication infrastructure 1202, which may comprise, for example, a bus or a network.

Computer system 1200 also includes a main memory 1206, preferably random access memory (RAM), and may also include a secondary memory 1220. Secondary memory 1220 may include, for example, a hard disk drive 1222, a removable storage drive 1224, and/or a memory stick. Removable storage drive 1224 may comprise a floppy disk drive, a magnetic tape drive, an optical disk drive, a flash memory, or the like. Removable storage drive 1224 reads from and/or writes to a removable storage unit 1228 in a well-known manner. Removable storage unit 1128 may comprise a floppy disk, magnetic tape, optical disk, or the like, which is read by and written to by removable storage drive 1224. As will be appreciated by persons skilled in the relevant art(s), removable storage unit 1228 includes a computer usable storage medium having stored therein computer software and/or data.

In alternative implementations, secondary memory 1220 may include other similar means for allowing computer programs or other instructions to be loaded into computer system 1200. Such means may include, for example, a removable storage unit 1230 and an interface 1226. Examples of such means may include a program cartridge and cartridge interface (such as that found in video game devices), a removable memory chip (such as an EPROM, or PROM) and associated socket, and other removable storage units 1230 and interfaces 1226 which allow software and data to be transferred from the removable storage unit 1230 to computer system 1200.

Computer system 1200 may also include a communication interface 1240. Communication interface 1240 allows software and data to be transferred between computer system 1200 and external devices. Examples of communication interface 1240 may include a modem, a network interface (such as an Ethernet card), a communications port, a PCMCIA slot and card, or the like. Software and data transferred via communication interface 1240 are in the form of signals which may be electronic, electromagnetic, optical, or other signals capable of being received by communication interface 1240. These signals are provided to communication interface 1240 via a communication path 1242. Communications path 1242 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 1228, removable storage unit 1230 and a hard disk installed in hard disk drive 1222. Computer program medium and computer readable medium can also refer to memories, such as main memory 1106 and secondary memory 1220, which can be semiconductor devices (e.g., DRAMs, etc.). These computer program products are means for providing software to computer system 1200.

Computer programs (also called computer control logic, programming logic, or logic) are stored in main memory 1206 and/or secondary memory 1220. Computer programs may also be received via communication interface 1240. Such computer programs, when executed, enable the computer system 1200 to implement features of the present invention as discussed herein. Accordingly, such computer programs represent controllers of the computer system 1200. Where the invention is implemented using software, the software may be stored in a computer program product and loaded into computer system 1200 using removable storage drive 1224, interface 1226, or communication interface 1240.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented on a machine having at least one processor, storage, and a communication platform connected to a network for tokenizing a non-delimited character string, comprising:
    creating a dictionary with words and phrases included in a set of search queries submitted via the network by users of one or more information retrieval systems including an Internet search engine over a first predetermined time period;
    identifying one or more series of characters within the non-delimited character string that match a word or phrase in the dictionary, wherein the identifying comprises:
    determining if there is any word or phrase in the dictionary that matches a series of characters that begins at a first character of the non-delimited character string,
    assigning, for each matching word or phrase, the matching word or phrase to a tokenization path comprising one or more contiguous words or phrases embedded within the non-delimited character string,
    removing a corresponding series of characters from beginning of the non-delimited character string to generate a shortened character string or terminate the tokenization path,
    terminating any tokenization path associated with the non-delimited character string if no matching word or phrase is identified by the determining,
    recursively performing the above determining, assigning, removing, and terminating with respect to any shortened character string generated by the assigning and removing until all tokenization paths are terminated to generate one or more tokenization paths, and
    determining a selected tokenization path from the one or more tokenization paths; and
    designating the word or phrase assigned to the selected tokenization path as a token associated with the non-delimited character string.

2. The method of claim 1, further comprising:
    periodically updating the dictionary with words and phrases included in additional sets of search queries submitted by users of the one or more information retrieval systems over predetermined time periods that are subsequent to the first predetermined time period.

3. The method of claim 1, further comprising:
storing the words and phrases in the dictionary into a prefix tree.

4. The method of claim 3, wherein identifying the one or more series of characters comprises:
traversing the prefix tree starting at the first character of the non-delimited character string and proceeding from node to node of the prefix tree based on the sequence of characters in the non-delimited character string until all matching words and phrases within the prefix tree are found.

5. The method of claim 3, wherein storing the words and phrases in the dictionary into a prefix tree comprises:
storing four letter prefixes and five letter prefixes associated with the words and phrases in the dictionary as nodes immediately below a root of the prefix tree.

6. The method of claim 1, wherein the one or more information retrieval systems include one or more of:
an information retrieval system configured to retrieve web pages;
an information retrieval system configured to retrieve images; and
an information retrieval system configured to retrieve news content.

7. A machine-readable tangible and non-transitory medium having information for enabling a processing unit to tokenize a non-delimited character string, wherein the information, when read by the machine, causes the machine to enable the processing unit to perform the following:
creating a dictionary with words and phrases included in a set of search queries submitted via a network by users of one or more information retrieval systems including an Internet search engine over a first predetermined time period;
identifying one or more series of characters within the non-delimited character string that match a word or phrase in the dictionary, wherein the identifying comprises:
determining if there is any word or phrase in the dictionary that matches a series of characters that begins at a first character of the non-delimited character string,
assigning, for each matching word or phrase, the matching word or phrase to a tokenization path comprising one or more contiguous words or phrases embedded within the non-delimited character string,
removing a corresponding series of characters from beginning of the non-delimited character string to generate a shortened character string or terminate the tokenization path,
terminating any tokenization path associated with the non-delimited character string if no matching word or phrase is identified by the determining,
recursively performing the above determining, assigning, removing, and terminating with respect to any shortened character string generated by the assigning and removing until all tokenization paths are terminated to generate one or more tokenization paths, and
determining a selected tokenization path from the one or more tokenization paths; and
designating the word or phrase assigned to the selected tokenization path as a token associated with the non-delimited character string.

8. The medium of claim 7, wherein the information, when read by the machine, further causes the machine to perform the following:
enabling the processing unit to periodically update the dictionary with words and phrases included in additional sets of search queries submitted by users of the one or more information retrieval systems over predetermined time periods that are subsequent to the first predetermined time period.

9. The medium of claim 7, wherein the information, when read by the machine, further causes the machine to perform the following:
enabling the processing unit to store the words and phrases in the dictionary into a prefix tree.

10. The medium of claim 9, wherein the step of enabling the processing unit to identify one or more series of characters comprises:
enabling the processing unit to traverse the prefix tree starting at the first character of the non-delimited character string and proceeding from node to node of the prefix tree based on the sequence of characters in the non-delimited character string until all matching words and phrases within the prefix tree are found.

11. The medium of claim 9, wherein the step of enabling the processing unit to store the words and phrases in the dictionary into a prefix tree comprises:
enabling the processing unit to store four letter prefixes and five letter prefixes associated with the words and phrases in the dictionary as nodes immediately below a root of the prefix tree.

12. The medium of claim 7, wherein the one or more information retrieval systems include one or more of:
an information retrieval system configured to retrieve web pages;
an information retrieval system configured to retrieve images; and
an information retrieval system configured to retrieve news content.

13. A system, comprising:
a processing unit; and
a memory containing a program, which, when executed by the processing unit, performs a method for tokenizing a non-delimited character string, the method comprising:
creating a dictionary with words and phrases included in a set of search queries submitted via a network by users of one or more information retrieval systems including an Internet search engine over a first predetermined time period;
identifying one or more series of characters within the non-delimited character string that match a word or phrase in the dictionary, wherein the identifying comprises:
determining if there is any word or phrase in the dictionary that matches a series of characters that begins at a first character of the non-delimited character string,
assigning, for each matching word or phrase, the matching word or phrase to a tokenization path comprising one or more contiguous words or phrases embedded within the non-delimited character string,
removing a corresponding series of characters from beginning of the non-delimited character string to generate a shortened character string or terminate the tokenization path,
terminating any tokenization path associated with the non-delimited character string if no matching word or phrase is identified by the determining, recursively performing the above determining, assigning, removing, and terminating with respect to any shortened character string generated by the assigning and removing until all tokenization paths are terminated to generate one or more tokenization paths, and determining a selected tokenization path from the one or more tokenization paths; and designating the word or phrase assigned to the selected tokenization path as a token associated with the non-delimited character string.

14. The system of claim 13, the method further comprising: periodically updating the dictionary with words and phrases included in additional sets of search queries submitted by users of the one or more information retrieval systems over predetermined time periods that are subsequent to the first predetermined time period.

15. The system of claim 13, further comprising:

storing the words and phrases in the dictionary into a prefix tree.

16. The system of claim 15, wherein storing the words and phrases in the dictionary into a prefix tree comprises:

storing four letter prefixes and five letter prefixes associated with the words and phrases in the dictionary as nodes immediately below a root of the prefix tree.

17. The system of claim 13, wherein the one or more information retrieval systems include one or more of:

an information retrieval system configured to retrieve web pages;

an information retrieval system configured to retrieve images; and an information retrieval system configured to retrieve news content.

18. The method of claim 1, wherein each of the words and phrases in the dictionary has an associated frequency that is above a predetermined threshold.

19. The method of claim 18, wherein the associated frequency for a particular word or phrase represents a ratio between the total number of times the particular word or phrase appears within a distinct search query and the total number of distinct search queries submitted by the users.

20. The method of claim 1, further including replacing at least a subset of the words and phrases stored in the dictionary with words and phrases included in an additional set of search queries submitted by the users.

\* \* \* \* \*